(12) United States Patent
Hervio

(10) Patent No.: US 7,406,821 B2
(45) Date of Patent: Aug. 5, 2008

(54) ADAPTER DEVICE FOR A ROCKET ENGINE NOZZLE HAVING A MOVABLE DIVERGING PORTION

(75) Inventor: Antoine Hervio, Saint Aubin de Medoc (FR)

(73) Assignee: Snecma Propulsion Solide, Le Haillan (FR)

( * ) Notice: Subject to any disclaimer, the term of this patent is extended or adjusted under 35 U.S.C. 154(b) by 230 days.

(21) Appl. No.: 11/001,926

(22) Filed: Dec. 2, 2004

(65) Prior Publication Data
US 2005/0229587 A1 Oct. 20, 2005

(30) Foreign Application Priority Data
Dec. 10, 2003 (FR) .................................. 03 14454

(51) Int. Cl.
*F02K 1/00* (2006.01)
*F02K 1/78* (2006.01)
(52) U.S. Cl. .............................. 60/228; 60/232; 60/770; 239/265.15; 239/265.35
(58) Field of Classification Search .................. 60/225, 60/245, 228, 230, 232, 770, 771; 239/265.15, 239/265.35
See application file for complete search history.

(56) References Cited

U.S. PATENT DOCUMENTS

| | | | | |
|---|---|---|---|---|
| 2,405,415 A | * | 8/1946 | Eksergian | 60/201 |
| 2,486,019 A | * | 10/1949 | Goddard | 60/264 |
| 2,912,820 A | * | 11/1959 | Whitmore | 60/225 |
| 3,079,752 A | | 3/1963 | Thielman | |
| 3,184,917 A | | 5/1965 | Caouette et al. | |
| 3,237,402 A | * | 3/1966 | Steverding | 239/265.15 |
| 3,253,403 A | * | 5/1966 | Hayes | 239/265.15 |
| 3,352,495 A | | 11/1967 | Fischer | |
| 3,392,918 A | * | 7/1968 | Goldberg | 239/265.35 |
| 3,659,423 A | * | 5/1972 | Lair et al. | 60/232 |
| 3,737,102 A | * | 6/1973 | Garard et al. | 239/265.15 |
| 3,855,789 A | * | 12/1974 | Piatzek | 60/225 |
| 4,272,956 A | * | 6/1981 | Lamere et al. | 60/242 |
| 4,307,839 A | * | 12/1981 | Nicoloff et al. | 239/265.39 |
| 4,434,614 A | * | 3/1984 | Gill et al. | 239/265.15 |
| 5,481,870 A | * | 1/1996 | Pacou et al. | 239/265.15 |
| 5,511,745 A | * | 4/1996 | Faupell et al. | 244/3.22 |
| 5,524,827 A | * | 6/1996 | Znamensky et al. | 60/232 |
| 5,779,151 A | | 7/1998 | Sutton | |

FOREIGN PATENT DOCUMENTS

FR 2 724 979 3/1996

* cited by examiner

*Primary Examiner*—Ted Kim
(74) *Attorney, Agent, or Firm*—Weingarten, Schurgin, Gagnebin & Lebovici LLP

(57) ABSTRACT

An adapter device for controlling a rocket engine nozzle under conditions of external pressure that can lead to the jet separating inside the nozzle, the nozzle being fitted with a diverging portion that is movably mounted relative to a stationary portion of the nozzle, thrust deflection then being achieved by swivelling the diverging portion so as to deflect the jet of combustion gas in contact with the inside wall of the diverging portion. The device includes a structure disposed inside the diverging portion in such a manner as to reduce the diverging nature of the flow section thereof and to increase the bearing area of pressure forces exerted by the jet on the diverging portion during swivelling thereof.

18 Claims, 4 Drawing Sheets

ADAPTER DEVICE FOR A ROCKET ENGINE NOZZLE HAVING A MOVABLE DIVERGING PORTION

This application claims priority to a French application No. 03 14454 filed Dec. 10, 2003.

BACKGROUND OF THE INVENTION

The present invention relates to steerable nozzles for rocket engines. The field of application of the invention is more particularly, but not exclusively, that of missiles, in particular tactical missiles having a diameter of less than about 500 millimeters (mm) and intended for operation under varying conditions of external pressure. A typical example of such a missile is a tactical missile launched from a submarine. The missile is ignited at great depth (about 150 meters (m)) and terminates its operational lifetime in the atmosphere after it has followed a determined trajectory obtained by controlling its nozzle(s).

The technology that makes use of a moving diverging portion for steering thrust presents numerous advantages compared with other known technologies for steering thrust such as those using a steerable nozzle on a flexible abutment, for example. Nozzles in which only the diverging portion is movable present thrust deflection capacities that are much greater than those which can be obtained with steerable nozzles in which the entire nozzle flow section is movable. This improvement in thrust deflection is explained by the fact that when the moving zone of the diverging portion is in a swivelled configuration, there exists an asymmetrical pressure field which leads to an amplification coefficient that is greater than 1 compared with the geometrical effect on its own. This technology and its advantages compared with other types of steerable nozzle are described in particular in French patent application FR 02/08370.

Nevertheless, such controllability can be obtained only on the assumption of not disturbing the flow in the flow section passing through the nozzle, where such a disturbance would be associated with the external pressure and the nature of the medium (liquid or gas). Unfortunately, given the combustion pressure levels presently generated in thrusters and the expansion profiles adapted for optimizing thrust thereof over the entire duration of a mission, the jet in the "active" thrust-deflection zone of the diverging portion can become separated in the presence of an external pressure that is high.

This phenomenon is shown in FIG. 1 which is a highly diagrammatic view of a rocket engine fitted with a nozzle having a moving diverging portion. The rocket engine comprises a casing 10 surrounding a combustion chamber 11 which opens out into a nozzle. The nozzle 20 is formed by a throat 12 receiving the hot gas produced in the combustion chamber, and by a diverging portion 20. The diverging portion 20 is movably mounted on the throat 12, which is itself secured to the end of the casing 10. Thus, the diverging portion is the only moving portion of the nozzle and by pivoting it enables the jet of combustion gas coming from the throat to be deflected so as to steer the trajectory of the thruster by changing the direction of its thrust vector.

Under conditions of high external pressure, as occurs under the sea, the diameter D of the jet 32 from the nozzle shrinks, causing the jet to become separated from the wall of the diverging portion, as shown in FIG. 1. This comes from the fact that nozzles are generally optimized as a function of the overall performance of the launcher. For this purpose, an expansion profile (i.e. the variation in the section of the nozzle) is defined as a function of a certain altitude referred to as the "matched" altitude, above which the majority of the flight is situated. Below this altitude, the nozzle is overexpanded and the high external pressure can lead to the jet becoming separated from the wall of the diverging portion.

When the jet separates from the wall of the diverging portion, a disturbed zone 30 is formed which extends from the point of jet separation to the end of the diverging portion, and into which the external fluid is drawn, which fluid can be a liquid or a gas, depending on the medium. The zone 31 against which pressure forces are applied, which leads, on swivelling, to a lateral force for steering the trajectory of the missile, and which usually extends over the entire inside surface of the diverging portion, becomes restricted to the upstream fraction of the diverging portion, i.e. to the fraction between the outlet from the throat and the point at which the jet separates inside the diverging portion. The asymmetry of the pressure field inside the diverging portion is considerably reduced, thereby reducing the lateral force that steers the missile. The influence of the lateral force on missile steering is even more limited since the zone of force application is located close to the point where the diverging portion bears against the throat (reduced lever effect). Thus, so long as the jet is separated from the wall of the diverging portion, the controllability of the nozzle remains very limited.

Furthermore, separation of the jet inside the nozzle can lead to instabilities causing vibratory stresses that are mechanically harmful.

The problem of reduced controllability due to the jet separating inside the diverging portion is particularly awkward in nozzles having a moving diverging portion since it is the forces that are applied against the inside wall of the diverging portion that enables the missile to be controlled in flight. In other systems using steerable nozzles, such as those including nozzles with a flexible abutment, it is the entire stream from the nozzle that is moved. Thus, the jet of gas ejected from the combustion chamber is deflected directly on leaving the throat since the axis of the throat is offset together with that of the diverging portion. Consequently, the thrust vector is steered at the throat of the nozzle, i.e. upstream from the diverging portion, so separation of the jet inside the diverging portion then has practically no influence on the controllability of the nozzle.

OBJECT AND BRIEF SUMMARY OF THE INVENTION

An object of the present invention is to provide a solution to the problem posed by the jet separating inside a nozzle having a moving diverging portion in order to eliminate or reduce is influence on the controllability of the nozzle.

In a first embodiment of the present invention, this object is achieved by an adapter structure which is placed inside the diverging portion of the nozzle so as to reduce the diverging nature of the flow section therein and increase the zone of application of the pressure forces exerted by the jet on the diverging portion while it is being swivelled. This structure enables the space present between the inside wall of the diverging portion and the jet when the jet becomes separated therefrom to be filled in so as to maintain contact via said structure between the jet and the diverging portion. Thus, even in the presence of high external pressure, it is possible to establish an asymmetrical pressure field within the diverging portion while it is being swivelled. With such a device, the thrust deflection capacity of a nozzle having a moving diverging portion is unaffected by an increase in the external pressure.

The shape, the dimensions, and the disposition of the adapter structure are preferably selected in such a manner as to optimize the effectiveness of swivelling and the impact on the performance of the engine propellant. By way of example, the structure may be in the form of an axially symmetrical body of revolution, or it may present protuberances in the form of fins disposed uniformly on the structure in the vicinity of the gas outlet section of the diverging portion. Thus even in the presence of separation of the jet, it can still be "attached" by the fins.

The structure may be present throughout the duration of the flight, or it may disappear at a determined instant in order to return the diverging portion to its normal configuration. Under such circumstances, the structure is secured to the diverging portion via connection means which are associated with means, e.g. pyrotechnic means, enabling the connection means to be caused to rupture at a determined length of time after firing. The structure may be made of a metal, of a resin filled with elastomer fibers, or of a thermostructural composite material.

The structure may also be retracted progressively so as to optimize expansion in the diverging portion as a function of a likewise progressive reduction in external pressure. Under such circumstances, the structure is made out of one or more ablatable materials that present an ephemeral nature in the presence of combustion gas.

In another embodiment of the invention, the problem of the influence of jet separation on the thrust deflection capacity in a nozzle having a moving diverging portion can be solved by putting an annular part into place at the end of the diverging portion at the gas outlet section, which part includes portions projecting towards the inside of the diverging portion so as to form, during swivelling of the diverging portion, an additional area against which the pressure forces exerted by the jet can bear. Thus, even in the presence of jet separation inside the nozzle, the jet can still be "attached" by the portions of the annular part which is secured to the diverging portion. This enables the jet to exert a greater force on the diverging portion during swivelling, and consequently enables the reduction in the pressure forces applied to the wall of the diverging portion in the event of jet separation to be compensated.

The shape, number, and dimensions of the projecting portions of the annular part are preferably defined as a function of the level of force compensation that it is desired to obtain when the jet is separated from the inside wall of the diverging portion.

Like the internal structure described above, the annular part can be secured to the diverging portion by connection means that are permanent or by fastener systems that can be caused to rupture under control at a determined instant.

For progressive disappearance, the part may be made of a material that presents an ephemeral nature in the presence of combustion gases so that it disappears progressively when in contact therewith.

The invention also provides a nozzle having a moving diverging portion fitted with one of the above-described adapter devices.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS OF THE INVENTION

Figure 2:
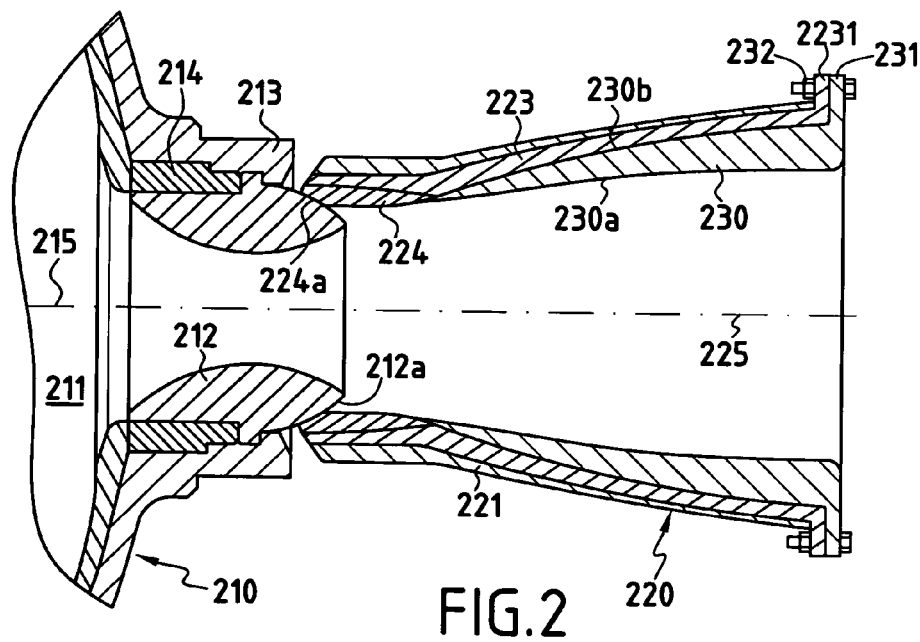
FIG. 2 is a highly diagrammatic axial section view of a nozzle fitted with an adapter device in accordance with a first embodiment of the invention.

FIG. 2 is a highly diagrammatic view of the rear portion of a rocket engine comprising a casing 210 surrounding a combustion chamber 211 in which a block of solid propellant (not shown) is housed. The chamber 211 opens out through its rear end wall 213 at the front of a nozzle comprising a throat 212 and a diverging portion 220.

The throat 212 which defines not only the throat proper of the nozzle, but also its converging portion and the beginning of its diverging portion, is stationary, for example it is screwed into a ring 214 secured to the end wall 213 of the casing so as to be secured to the end wall 213.

The diverging portion 220 of the nozzle is mounted movably on the nozzle throat 212, which is itself secured to the casing 210. Typically, the moving diverging portion comprises a casing 221, e.g. in the form of a metal carrying an inside layer 223 of insulating material such as an ablative composite material, e.g. made up of carbon or silica reinforcement and a matrix of phenolic resin. At its upstream end, the moving diverging portion 220 comprises a part 224 in the form of an internal ring typically made of a thermostructural composite material. The throat 212 and the moving diverging portion 220 are in mutual contact via respective spherical surfaces 212a and 224a centered on the axis 215 of the nozzle. The diverging portion 220 is then movable relative to the throat 212 in several directions. Thus, by swivelling the diverging portion, the thrust is steered as a function of the angle formed between the axis 225 of the diverging portion and the axis 215 of the nozzle.

The moving diverging portion of the nozzle is connected to the stationary portion thereof via a mechanical connection (not shown) comprising actuator means (e.g. actuators) enabling the swivelling of the diverging portion to be controlled. This type of mount for a nozzle having a moving diverging portion is well known in itself and is not described in greater detail. An embodiment of such a nozzle is described in particular in French patent application FR 02/08370.

Other known types of mounting and actuation for a diverging portion that is movable relative to a stationary nozzle portion could naturally be envisaged.

Figure 1:
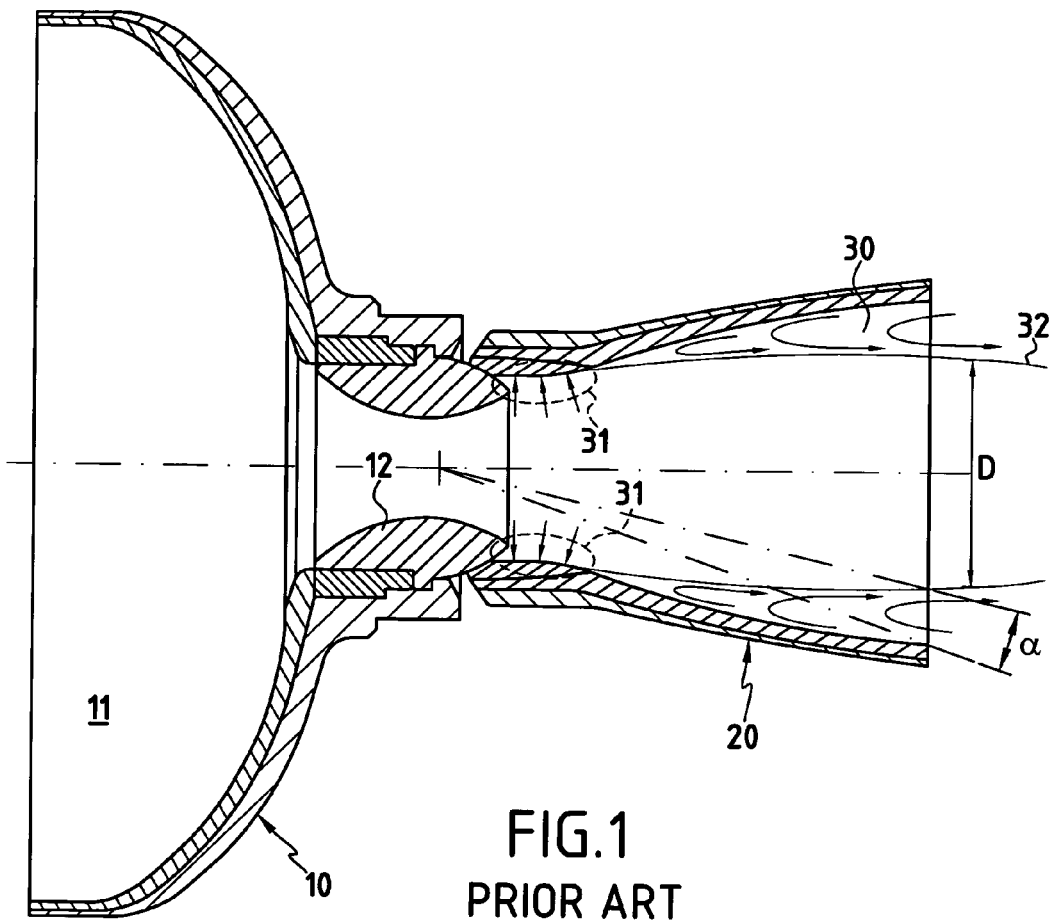
FIG. 1 is a highly diagrammatic axial section view of a nozzle having a moving diverging portion and illustrating the phenomenon of the jet separating inside the diverging portion.

The nozzle that is steerable by means of its moving diverging portion is advantageous insofar as it enables thrust deflection to be amplified as a function of the effective pivot angle of the main axis of the diverging portion. Nevertheless, as explained above, this capacity for thrust deflection decreases significantly if the jet becomes separated. When there is a gap between the jet and the inside wall of the diverging portion, as shown in FIG. 1, the impact of the jet on the diverging portion is very limited because of its small area of contact with the diverging portion. More precisely, in the presence of a jet that has separated inside the diverging portion, the influence of swivelling the diverging portion on steering the thrust vector remains limited so long as the swivelling remains within a range of angles that does not allow the jet to re-adhere significantly to the inside wall of the diverging portion.

In other words, in the event of the jet becoming separated, the optimum capacity for deflecting thrust is to be found only beyond a certain swivel angle $\alpha$ (FIG. 1), which angle is a function of the space that is present between the jet and the inside wall of the diverging portion. If the swivelling range of the nozzle is insufficient for causing the jet to re-attach to the inside wall of the diverging portion, it can become very difficult to control the missile since the maximum swivel angle of the diverging portion is less than the swivel angle needed for causing the jet to re-attach effectively to the diverging portion.

In a first embodiment of the invention, a structure 230 is introduced in the diverging portion 220 of the nozzle. This structure 230 enables the flow section of the diverging portion to be reduced so as to prevent the jet separating when the external pressure is such that it would normally lead to the jet separating in the absence of such a structure. The shape and the dimensions of the structure 230 can be very varied depending on the profile of the flow section that is to be obtained, in particular for optimizing swivelling effectiveness.

Nevertheless, it can be stated that the structure 230 preferably presents an outside shape 230b close to the shape of the moving portion diverging portion in which it is to be disposed, and an inside shape 230 which conserves a substantially diverging structure so as to ensure that the combustion gas expands properly. The thickness of the structure 230 should be determined so as to occupy the space between the jet and the inside wall of the diverging portion during separation of the jet. This thickness is preferably determined so as to occupy the maximum space that can exist between the jet and the diverging portion when the jet has separated. Maximum separation occurs for the highest external pressure that is encountered in flight. For example, with a missile that is for launching underwater, the thickness of the structure 230 should be designed to occupy the space that is present at the firing depth which corresponds to the highest external pressure that occurs during flight.

The structure 230 may be fastened to the diverging portion by fastener members 232 such as bolts, for example. Under such circumstances, the structure 230 has a flange 231 which co-operates with a flange 2231 on the internal protective liner 223 of the diverging portion. In a variant, the flange 231 may be fastened to a flange on the casing 221 of the diverging portion. The flanges are preferably outwardly directed at the outlet from the diverging portion, i.e. they are located outside the flow section of the nozzle so as to avoid disturbing the flow.

The structure 230 may be present throughout the entire duration of flight, or it may disappear at a determined instant after which the natural swivelling capacity of the moving diverging portion is compatible with the requirements for controlling the missile, in particular for the purpose of optimizing the propulsive performance of the engine. If the adapter device is conserved throughout the duration of the flight, the structure 230 and the internal protective liner 23 may constitute a single element. With the embodiment of FIG. 2, the fastener members 232 may be fitted with a pyrotechnic explosive bolt system or with a detonating cord cutting off the end of the diverging portion, or indeed any other mechanical system for causing the structure to be expelled at a determined instant. Alternatively, the structure 230 may be constituted by an ablative material enabling said structure to disappear progressively. For a missile that is launched underwater, for example, that enables the flow section to have a profile that increases as the external pressure decreases, thereby optimizing gas expansion and consequently optimizing propulsion performance during flight.

Flow section can also be modified progressively during a mission using a structure made up of a plurality of sub-structures that are nested one in another and suitable for being released in succession at determined instants during the mission. For this purpose, each sub-structure may be fastened to the adjacent sub-structure or to the diverging portion via connection means suitable for rupturing under control.

Figure 3A:
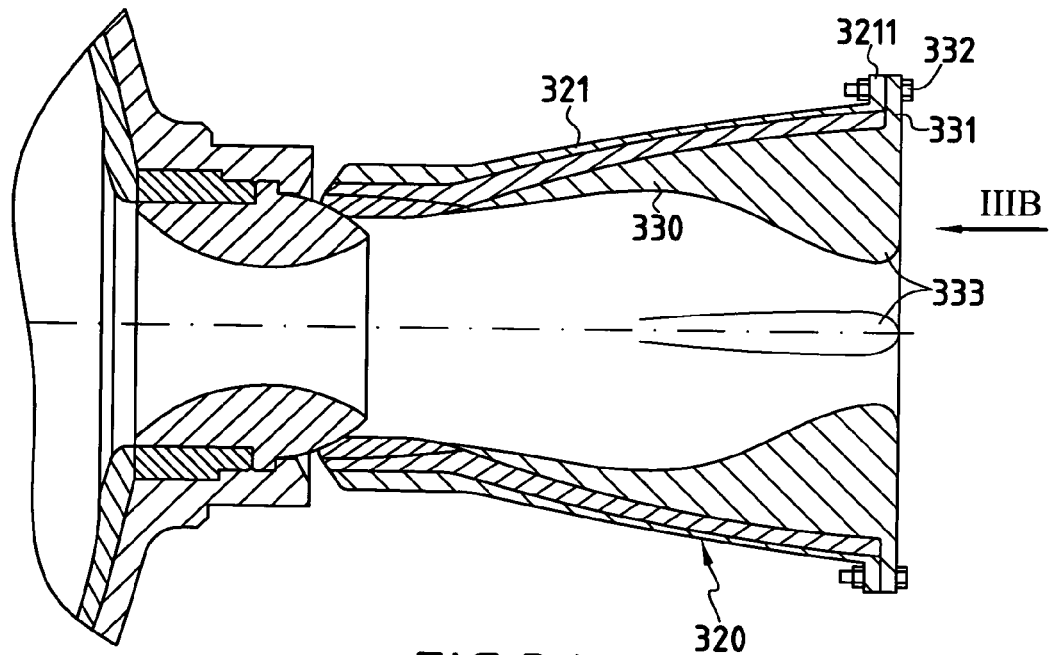
FIGS. 3A, 3B, 4A, and 4B are highly diagrammatic views showing two variant embodiments of the FIG. 2 device.
Figure 3B:
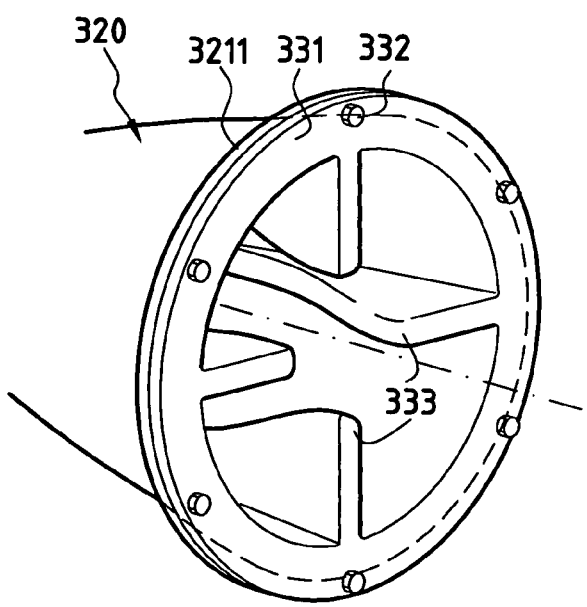

The embodiment shown in FIGS. 3A and 3B differs from that shown in FIG. 2 in particular in that its internal structure disposed inside the diverging portion presents a shape that is not axially symmetrical at its downstream end. In this embodiment, the structure 330 has protuberances 333 at its downstream end which project into the flow section of the nozzle in the vicinity of the outlet from the diverging portion. In order to avoid excessively disturbing the flow and in order to conserve thrust that is uniform, the protuberances 333 are streamlined in the form of fins that are uniformly distributed around the axis of the structure 330. The protuberances 330 thus form obstacles for the jet inside the diverging portion. This enables the jet to remain continuously in contact with an element that is secured to the diverging portion and consequently enables thrust to be deflected effectively, even when the jet has separated.

Like the structure 230 in FIG. 2, the structure 330 is held inside the diverging portion by fastener members 332 of the bolt type inserted through holes pierced in the flange 331 of the structure and in a flange 3211 of the outer casing 321 of the diverging portion. In this case, the structure 330 is fastened via a flange 3211 to the outer casing 321 of the diverging portion instead of being fastened to its internal protective liner as shown in FIG. 2.

Figure 4A:
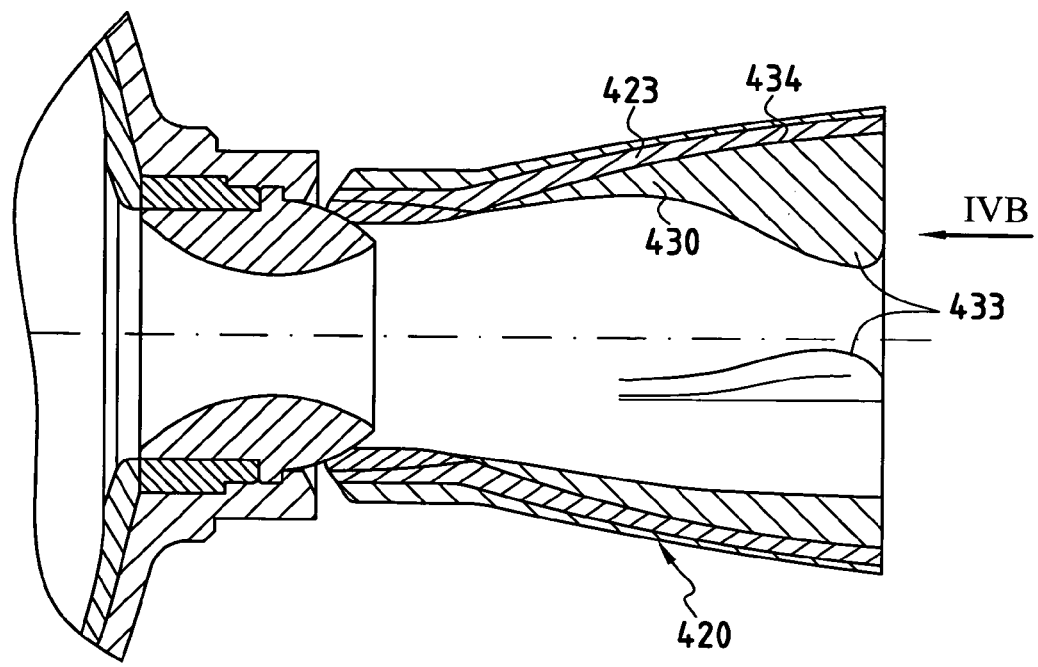
Figure 4B:
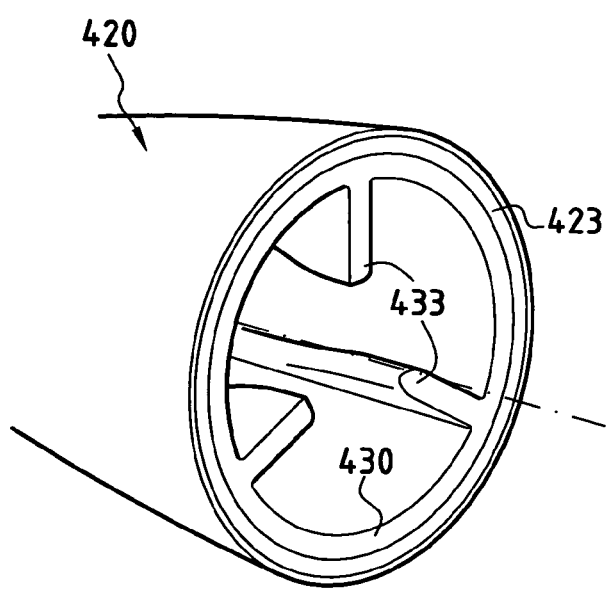

FIGS. 4A and 4B show a variant structure enabling the jet to be caused to adhere within the diverging portion in accordance with the invention. In this embodiment, the structure 430 has three protuberances 433 distributed uniformly towards the downstream end of the structure 430. Apart from the number of its protuberances, the structure 430 differs from that shown in FIGS. 3A and 3B in that it is fastened by means of a layer of adhesive 434 deposited on the internal protective liner 430 of the diverging portion 420. Under such circumstances, the overall structure is simplified since no fastening flange is formed on the structure for causing the jet to remain attached, nor on the casing of the diverging portion, nor on its internal protective liner. The adhesive bond can be reinforced if necessary by pegs (not shown) extending perpendicularly to the axis of the nozzle and penetrating into the structure but without projecting into the flow section. The structure 430 is advantageously made of an ablatable material.

Figure 5A:
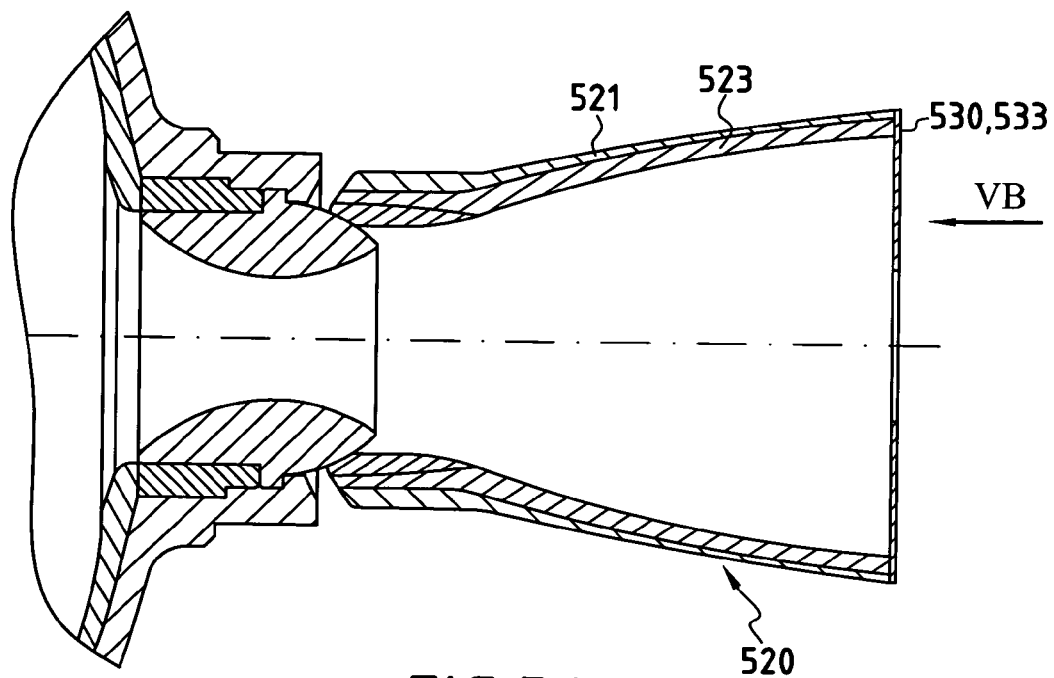
FIGS. 5A and 5B are highly diagrammatic views of a nozzle fitted with an adapter device in accordance with a second embodiment of the invention.
Figure 5B:
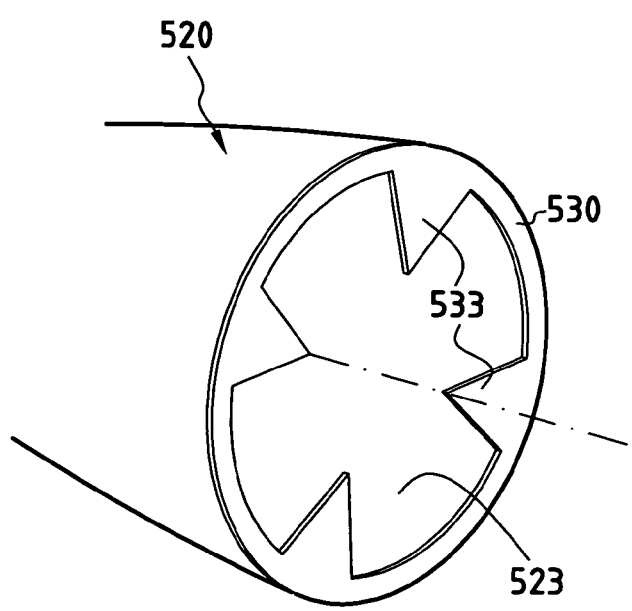

In accordance with the invention, the problem of nozzle controllability in the event of the jet separating can also be solved using devices that are not disposed inside the diverging portion, but instead that are disposed at the outlet therefrom. As shown in FIGS. 5A and 5B, the diverging portion 520 may be fitted with an annular part 530 that is fastened to the end of the diverging portion 520 at the gas outlet section. The annular part 530 has projections 533 that extend towards the inside of the diverging portion. In the event of the jet separating inside the diverging portion, the projections are used as additional bearing surfaces for the pressure forces exerted by the ejected jet of combustion gas. When the diverging portion is swivelled in one direction, the jet will strike one or more of these projections over an area of greater or lesser size depending on the applied swivel angle. By placing the annular part at the end of the diverging portion at the gas outlet section, a large lever arm is established between the point where the force exerted by the jet bears and the guiding center of the diverging portion, thereby making control easier.

The geometry of the annular part (shape, number, and disposition of the projections, . . . ) can be very varied. It is defined mainly as a function of requirements in terms of thrust deflection.

As in the embodiment and variants shown in FIGS. 2 to 4, the annular part may be present throughout the duration of flight or it may disappear at a determined instant. The part can thus be fastened to the diverging portion by connection members optionally fitted with means for causing the structure to be expelled at a determined instant. Alternatively, the annular part may be constituted by an ablatable material in order to allow the structure to disappear progressively during flight.

Whatever the type of adapter device of the invention under consideration (i.e. an insert in the diverging portion or an annular part at the end thereof), a variety of component materials can be selected. The material selected depends in particular on the gas and the temperatures encountered, and also on the technique selected for eliminating the structure. It may be made of metal, of an organic-matrix composite material constituted by fibers of glass, aramids, polyethylene, etc., and a resin such as epoxy resin, phenolic resin, or indeed elastomer, or it may be a thermostructural composite material such as carbon/carbon (C/C) or carbon silicone carbide (C/SiC). For a material that is to ablate under the effect of the combustion gas, a material can be selected that sublimes under the effect of hot gas, such as a composite material of the fiberglass reinforced resin type or a metal that is easily sublimable, such as aluminum.

What is claimed is:

1. An adapter device for controlling a rocket engine nozzle, having a jet, under conditions of external pressure that can lead to the jet separating inside the nozzle,
    the nozzle being fitted with a diverging portion that is movably mounted relative to a nozzle throat, said nozzle throat being stationary,
    thrust deflection then being achieved by swivelling the diverging portion so as to deflect the jet of combustion gas in contact with the inside wall of the diverging portion,
    wherein a structure is disposed inside the diverging portion and formed separately therefrom to increase a surface area over which pressure forces are exerted by the jet on the diverging portion when the diverging portion is swiveled to decrease jet separation and so as to reduce the diverging nature of the flow section thereof,
    the structure including a plurality of protuberances that are distributed on the inside wall of and along the axis of the structure and that project some radial distance into the flow section to provide additional surface area for deflecting the jet in said flow section,
    the plurality of protuberances having a streamlined shape whose radial distance of projection into the flow stream substantially increases in an axial direction towards the downstream end of said structure before decreasing proximate said gas outlet portion of said diverging portion; and
    wherein said structure is fixed with respect to the diverging portion.

2. A device according to claim 1, wherein the structure is in the form of an axially symmetrical body of revolution.

3. A device according to claim 1, wherein the structure further comprises protuberances in the form of fins disposed uniformly on the structure in the vicinity of the gas outlet section from the diverging portion.

4. A device according to claim 1, wherein the structure is fastened to the diverging portion by connection means, and wherein means are provided for causing said connection means to rupture at a determined instant by using a mechanical or a pyrotechnic system.

5. A device according to claim 1, wherein the structure is made up of a plurality of elements engaged one in another, and wherein each element is fastened by connection means that can be controlled to rupture at a determined instant.

6. A device according to claim 1, wherein the structure is constituted by a metal, a resin reinforced by elastomer fibers, or a thermostructural composite material.

7. A device according to claim 1, wherein the structure is made of a material that is ephemeral in the presence of combustion gas so as to disappear progressively in contact therewith.

8. A rocket engine nozzle having a moving diverging portion, the nozzle being fitted with an adapter device according to claim 1.

9. A device according to claim 1, wherein the plurality of protuberances is releasably fastened to an outer casing of the diverging portion using a flange and fastening device.

10. A device according to claim 1, wherein the plurality of protuberances is adhesively fastened to the inner surface of the diverging portion or to the structure.

11. An adapter device for controlling a rocket engine nozzle, having a jet, under conditions of external pressure that are such that they can lead to the jet separating inside the nozzle,
    the nozzle being fitted with a diverging portion movably mounted relative to a stationary portion of the nozzle,
    thrust deflection then being achieved by swivelling the diverging portion in such a manner as to deflect the combustion gas jet in contact with the internal wall of the diverging portion,
    wherein an annular part is fastened to the end of the diverging portion at the gas outlet section, said annular part having portions circumferentially spaced apart from one another and projecting towards the inside of the diverging portion so as to form, during swivelling of the diverging portion, an additional area secured to the diverging portion and against which the pressure forces exerted by the jet can bear.

12. A device according to claim 11, wherein the annular part is fastened to the diverging portion by connection means, and wherein means are provided for causing said connection means to rupture at a determined instant by means of a mechanical or a pyrotechnic system.

13. A device according to claim 11, wherein the annular part is made of a metal, an elastomer fiber reinforced resin, or a thermostructural composite material.

14. A device according to claim 11, wherein the annular part is made of a material that is ephemeral in the presence of combustion gas so as to disappear progressively in contact therewith.

15. A device, for use with a rocket engine nozzle, including a stationary nozzle throat and the diverging portion that is movably mounted relative to the nozzle throat, under conditions of relatively high, initial external pressure, for minimizing separation of a jet created by the rocket engine nozzle and having a flow section, from an inside surface of said movably mounted diverging portion,
    wherein thrust deflection of said rocket engine nozzle is achieved by adjusting an orientation of said diverging portion and the flow section, to deflect the jet to maximize an area of contact between said jet and diverging portion, the device comprising:

a structure that is disposed inside of and fixed with respect to said diverging portion and formed separately therefrom, to reduce the diverging nature of the flow section and, when the orientation of the diverging portion is adjusted, to increase the area of contact between said jet and said inside surface of the diverging portion and to decrease jet separation, the structure including a plurality of protuberances that are distributed on the inside wall of and along the axis of the structure and that project some radial distance into the flow section to provide additional surface area for deflecting the jet in said flow section, and the plurality of protuberances having a streamlined shape whose radial distance of projection into the flow stream substantially increases in an axial direction towards the downstream end of said structure before decreasing proximate said gas outlet portion of said diverging portion.

16. The device as recited in claim 15, wherein the relatively high, initial external pressure corresponds to a hydrostatic pressure below sea-level.

17. The device as recited in claim 16, wherein the relatively high, initial external pressure corresponds to a hydrostatic pressure approximately 150 meters below sea-level.

18. The device as recited in claim 15, wherein the structure is ablative and only temporarily fixed with respect to said diverging portion.

* * * * *